US007706805B2

(12) United States Patent
Xu

(10) Patent No.: US 7,706,805 B2
(45) Date of Patent: Apr. 27, 2010

(54) DELIVERY OF TIME-SENSITIVE DATA IN A WIRELESS NETWORK

(75) Inventor: Xiaode Xu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 787 days.

(21) Appl. No.: 11/468,865

(22) Filed: Aug. 31, 2006

(65) Prior Publication Data
US 2008/0056221 A1 Mar. 6, 2008

(51) Int. Cl.
*H04W 72/00* (2009.01)
(52) U.S. Cl. .................... 455/452.1; 455/434; 455/509; 455/515; 455/154.1; 370/325
(58) Field of Classification Search ................... 455/62, 455/464, 510, 434, 450, 455, 509, 575, 154.1; 370/325
See application file for complete search history.

(56) References Cited

U.S. PATENT DOCUMENTS

2005/0135291 A1* 6/2005 Ketchum et al. ............ 370/319

OTHER PUBLICATIONS

Y.P. Fallah, A. Elfeitori and H. Alnuweiri: "A Unified Scheduling Approach for Guaranteed Services over IEEE 802.11e Wireless LANs," Proceedings, First International Conference on Broadband Networks, 2004 "BroadNets 2004", pp. 375-384.

J. Guo, J. Zhang and W. Chen, "A Dynamic QoS Algorithm for Wireless AV Home Networks" International Conference Advanced Communication Technology, vol. 3, pp. 1526-1531, Feb. 2006.
J. Strater and G. Beacham, "Seamless Mobility Between Home Networks And Cable Services," Motorola White Paper, May 27, 2005, Motorola Inc., Schaumburg, Illinois. Downloaded Aug. 5, 2006. Available online at: http://broadband.motorola.com/ips/pdf/Seamless_Mobility.pdf.
Q. Ni and T. Turletti, "QoS Support for IEEE 802.11 Wireless LAN," in "Wireless LANs and Bluetooth (Wireless Networks and Mobile Computing, vol. 4)", Nova Science Publishers, 2005.
S. Chung and K. Piechota, "Understanding the MAC Impact of 802.11e: Part 2," Oct. 30, 2003, CommsDesign.com. Downloaded on Feb. 24, 2004 from: http://www.commsdesign.com/design_corner/showArticle.jhtml?articleID=16502136.
"TGn Sync Proposal Technical Specification," part of MAC and PHY layer of the TGn Sync proposal to the IEEE 802.11 TGn, IEEE 802.11-04/0889r6, May 2005. IEEE New York, New York.
"IEEE Standard for Wireless LAN Medium Access Control (MAC) and Physical Layer (PHY) Specifications: Amendment 8: Medium Access Control (MAC) Quality of Service Enhancements," IEEE Std 802.11e-2005, IEEE New York, New York. Available at www.IEEE. org.

* cited by examiner

*Primary Examiner*—Nick Corsaro
*Assistant Examiner*—Quan M Hua
(74) *Attorney, Agent, or Firm*—Dov Rosenfeld; INVENTEK

(57) ABSTRACT

Embodiments of the invention include a method and software for pre-allocating bandwidth for time-sensitive data such as voice data, for allocating some of the pre-allocated bandwidth to calls, and for timely delivery of frames that include time-sensitive data such as voice data in both the uplink and downlink direction for calls between an access point, e.g., a quality-assured access point (Q-AP) and one or more of its client stations.

19 Claims, 5 Drawing Sheets

DELIVERY OF TIME-SENSITIVE DATA IN A WIRELESS NETWORK

TECHNICAL FIELD

The present disclosure relates generally to wireless networks that carry voice or other time-sensitive data.

BACKGROUND

Delivery of time-sensitive data streams such as VoIP packets in an infrastructure wireless network, such as a QoS enhanced basic service set (Q-BSS) that conforms to the IEEE 802.11 standard, including IEEE 802.11e or Wi-Fi Multimedia (WMM) that is based on a subset of IEEE 802.11e, continues to be challenging. There still are issues to be resolved to achieve relatively high voice quality.

Some time-sensitive data communication, e.g., voice communication needs to maintain constant bit rate (CBR) per call basis. In order to provide the constant bit rate, many small packets are constantly transmitted. Use of known IEEE 802.11e mechanisms to carry such relatively small frames can significantly hurt the bandwidth efficiency expressed, for example, as the percentage of the total bandwidth used for application data transferred over the radio interface. In addition to bandwidth efficiency, there is a bottleneck issue in the downlink direction from the access point. One central access point (AP), e.g., a quality enhanced AP (Q-AP) pushes multiple speech frames to multiple client stations associated with the AP.

SUMMARY OF THE INVENTION

Particular embodiments of the invention include a method and software for pre-allocating bandwidth for time-sensitive data such as voice data, for allocating some of the pre-allocated bandwidth to calls, and for timely delivery of frames that include time-sensitive data such as voice data in both the uplink and downlink direction for calls between an access point, e.g. a quality-assured access point (Q-AP) and one or more of its client stations.

One method embodiment includes pre-allocating a dedicated amount of available bandwidth in a wireless network to time-sensitive payload data. The dedicated amount is divided into one or more sets each for what is called a time-sensitive data train, each set having a plurality of containers. The containers of each set are for carrying a fixed amount of payload data. Each different time-sensitive data train can use a different fixed size for its containers.

An embodiment further includes allocating a number of one or more containers of one of the sets of containers, e.g., one of the time-sensitive data trains for a call between a particular access point of the wireless network and a first client station of the particular access point.

One embodiment further includes aggregation on the downlink from an access point, e.g., the particular access point. The access point transmits a time-sensitive data downlink data frame that includes time-sensitive data payloads for a first set of one or more client stations. The time-sensitive data payload for any particular client station uses a corresponding allocated number of one or more containers of the one of the sets of containers, e.g., of the one of the time-sensitive data trains.

One embodiment further includes an access point announcing the pre-allocation of certain bandwidth specific for use by time-sensitive data such as voice call data using an information element, called a TSDT Scheduler IE, in beacon and probe response frames.

Another embodiment includes a method comprising a particular client station associating with an access point of a wireless network, including receiving a beacon frame and/or a probe response frame from the access point, each beacon and probe response frame including an information element announcing a pre-allocation of a dedicated amount of available bandwidth to time-sensitive payload data, the dedicated amount being divided into one or more sets, each of a plurality of containers, the containers of each set for carrying a fixed amount of payload data. The method further includes the particular client station receiving a time-sensitive data downlink data frame from the access point, the time-sensitive data downlink data frame including time-sensitive data payloads for a first set of one or more client stations including the particular client station, the time-sensitive data payload for the particular client station being for a call for which a number of one or more containers of one of the sets of containers have been allocated.

Another embodiment includes logic encoded in one or more tangible media for execution that when executed is operable to pre-allocate a dedicated amount of available bandwidth in a wireless network to time-sensitive payload data, the dedicated amount being divided into one or more sets, each of a plurality of containers, the containers of each set for carrying a fixed amount of payload data. The logic when executed is also operable to allocate a number of one or more containers of one of the sets of containers for a call between a particular access point of the wireless network and a first client station of the particular access point. The logic when executed is also operable to cause a particular access point to transmit a time-sensitive data downlink data frame that includes time-sensitive data payloads for a first set of one or more client stations including the first client station, the time-sensitive data payload for any particular client station using a corresponding allocated number of one or more containers of the one of the sets of containers.

Another embodiment includes logic encoded in one or more tangible media for execution that when executed is operable to cause a particular client station to associate with an access point of a wireless network, including receiving a beacon frame and/or a probe response frame from the access point, both frames including an information element announcing a pre-allocation of a dedicated amount of available bandwidth to time-sensitive payload data, the dedicated amount being divided into one or more sets, each of a plurality of containers, the containers of each set for carrying a fixed amount of payload data. The logic when executed is also operable to cause the particular client station to receive a time-sensitive data downlink data frame from the access point, the time-sensitive data downlink data frame including time-sensitive data payloads for a first set of one or more client stations including the particular client station, the time-sensitive data payload for the particular client station being for a call for which a number of one or more containers of one of the sets of containers have been allocated.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF EXAMPLE EMBODIMENTS

Particular embodiments of the invention include a method and software for providing bandwidth for time-sensitive data such as voice data and for providing timely delivery of frames that include time-sensitive data such as voice data in both the uplink and downlink direction for calls between an access point, e.g., a Q-AP and one or more of its client stations.

Figure 1:
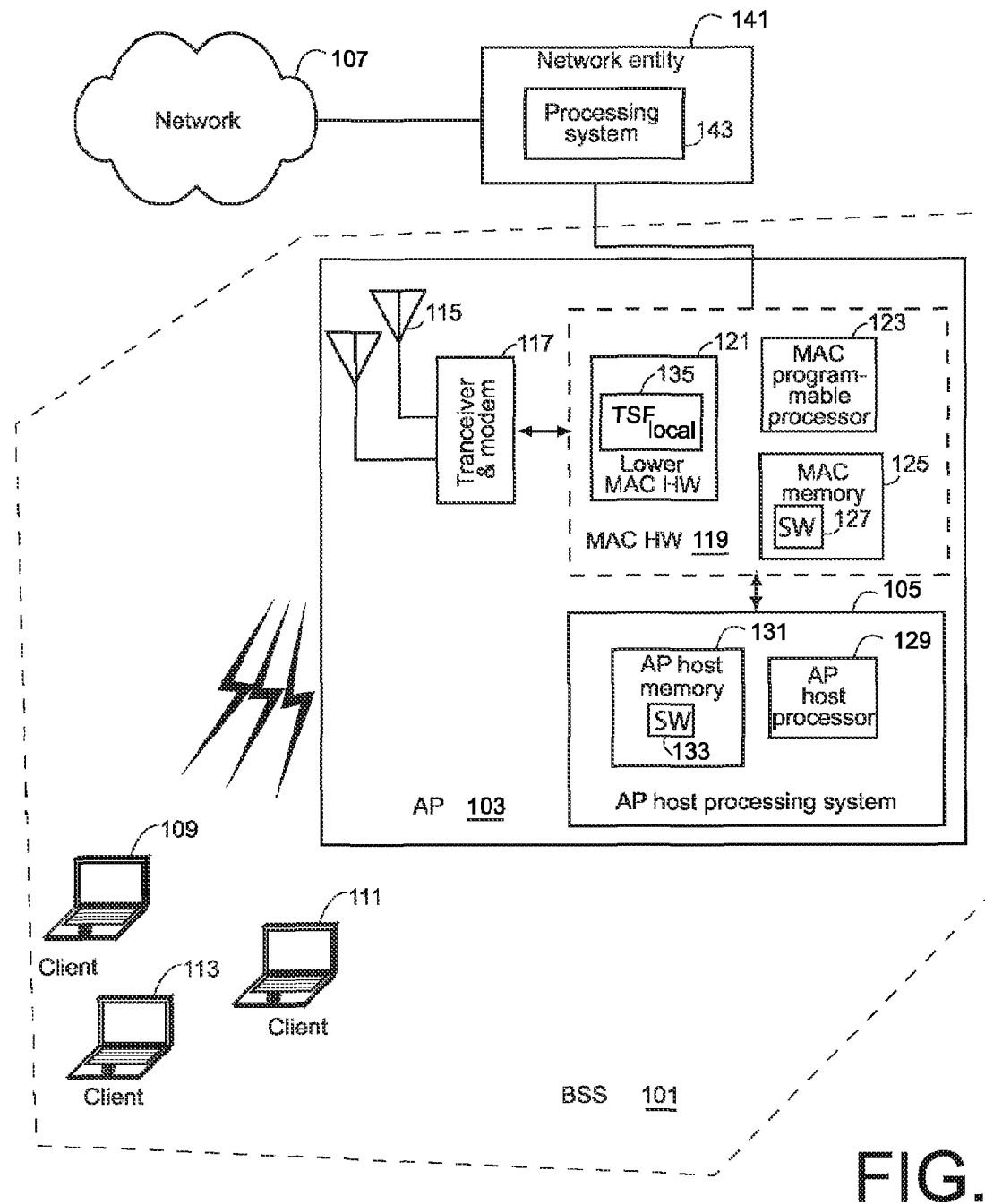
FIG. 1 shows one embodiment of an example wireless network that includes one or more aspects of the present invention. The wireless network has an access point and one or more associated client stations.

FIG. 1 shows one embodiment of an example wireless network that includes aspects of the present invention. The network includes a BSS 101, e.g., a Q-BSS that includes an access point (AP) 103, e.g., a Q-AP in communication with one or more client stations. Three such client stations, 109, 111 and 113 are shown in FIG. 1. The AP 103 is coupled to, e.g. via a wired network to a network entity 141. One example of such an entity is a switch. Coupling between the AP and the entity 141 also can be a non-network connection. For example, in some embodiments, the AP and the network entity 141 are in the same device. In one such embodiment wherein the AP and the network entity 141 are in the same device, the network entity role is to operate as the host processor for the AP. The network entity 141 in the example network shown in FIG. 1 is coupled to a network 107, e.g., a private network which might be coupled to a larger network, e.g., a public network such as the Internet.

Some of the elements in a typical AP are shown for AP 103. Included is at least one antenna 115, a front end 117 that includes at least one transceiver and at least one modem. The received bits are provided to, and the bits for transmission are obtained from MAC hardware 119 that provides the MAC functionality. The MAC hardware is coupled to an AP host processing system 105. In one embodiment, the MAC functionality is purely in hardware, and in another, as shown in FIG. 1, the MAC functionality is provided by a combination of hardware and software that includes lower MAC hardware 121, a MAC processing system that includes a MAC programmable processor 123 which is coupled, e.g., via a bus subsystem (not shown) to MAC memory 125. The MAC memory can load software 127 that when executed on the MAC programmable processor provides, in combination with lower MAC HW 121, the MAC functionality. In one embodiment, the software 127 includes one or more aspects of the present invention, including when executing on the MAC programmable processor, the AP time-sensitive data train processing described herein.

In one embodiment, the MAC processing is carried out in part in the MAC HW 119 and in part in a AP host processing system 105 included in the wireless station that forms the AP. The AP host processing system 105 includes a host processor 129 coupled to host memory 131 that includes software 133. In one embodiment, some of the MAC functionality is carried out in the host processor 129. Some of the software 133 in the host memory 131 is for such processing.

In another embodiment, the MAC processing is carried out in part in the AP and in part in the network entity 141, e.g., a switch. The entity 141 includes a network entity host processing system 143 that includes a network entity host processor (not shown) coupled to network entity host memory (not shown) that includes software (not shown). In one embodiment, some of the MAC functionality of the AP is carried out in the network entity host processing system 143. Data is streamed to or from the network entity host processor, depending on whether the AP is receiving or transmitting, via the link between the entity 141 and the AP 103. Some of the software in the network entity host memory is for such processing.

The MAC processing embodiment, and one or more embodiments of the present invention use the time synchronization function (TSF) of the MAC HW 119 of the AP. Such a time synchronization function provides a TSF time, denoted TSF herein, using a local TSF clock 135.

In one embodiment, scheduling and call admission control aspects of the present invention are provided as part of the software 133 that is executable on the host processor 129 of the AP host processing system 105.

Note that FIG. 1 shows an access point whose functionality and elements are partitioned in one way. Those in the art will understand that other embodiments use other types of hardware and software for the AP, partitioned in other ways. AP aspects of the present invention can be practiced in many types of APs as would be clear to those in the art.

Figure 2:
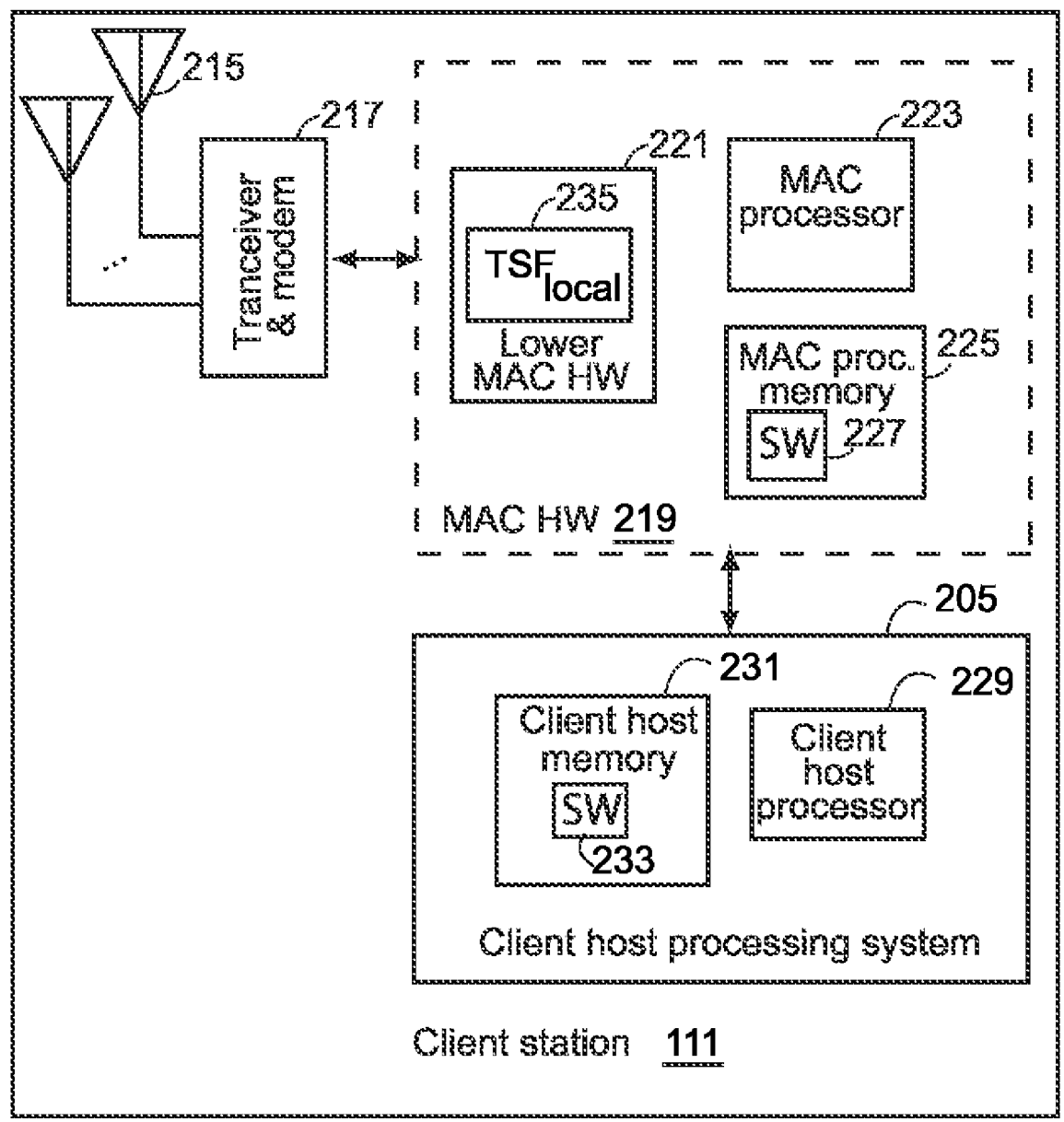
FIG. 2 shows one embodiment of a client station that includes one or more aspects of the present invention.

FIG. 2 shows one embodiment of an example client station, e.g., a quality-enhanced client station associated with AP 103, e.g., client station 111. Some of the elements in the client station are similar to those shown in FIG. 1 for AP 103. Included is at least one antenna 215, a front end 217 that includes at least one transceiver and at least one modem. The received bits are provided to, and the bits for transmission are obtained from MAC hardware 219 that provides the MAC functionality. In one embodiment, the MAC functionality is purely in hardware, an another, as shown in FIG. 2, the MAC functionality is provided by a combination of hardware and software that includes lower MAC hardware 221, a MAC processor 223 which is coupled, e.g., via a bus subsystem (not shown) to MAC memory 225. The MAC memory can load software 227 that when executed on the MAC processor provides, in combination with lower MAC HW 221, the MAC functionality. In one embodiment, the software 227 includes one or more aspects of the present invention, including when executing on the MAC processor, the client station time-sensitive data train processing described herein.

In one embodiment, the MAC processing is carried out in part in the MAC HW 219 and in part in a host processing system 205 included in the client station that includes a host processor 229 coupled to host memory 231 that includes software 233. In one embodiment, some of the MAC functionality of the client station is carried out in the host processor 229. Some of the software 233 in the host memory 231 is for such processing.

Embodiments of MAC processing, and one or more embodiments of the present invention use the TSF functionality of the MAC HW 219 of the client station. Such time synchronization functionality uses a local TSF clock 235. The TSF clock is aligned with the TSF setting received via beacon or probe response frames from the serving AP 103.

Note that FIG. 2 shows a client station whose functionality and elements are partitioned in one way. Those in the art will understand that other embodiments use other types of hardware and software for the client station partitioned in other ways. The client station aspects of the present invention can be practiced in many types of client stations as would be clear to those in the art.

New MAC Frames

One embodiment includes using a plurality of pre-defined MAC frames that are in addition to those already defined for the standard. Table 1 shows five new time-sensitive data train (TSDT) frames, e.g., voice train (VT) frames for an embodiment applicable to a system that substantially conforms to the IEEE 802.11 standard and its various amendments. A time-sensitive data train exchange sequence, e.g., a voice train exchange sequence includes a sequence of TSDT frames of Table 1. Table 1 includes the Type field and Subtype fields of the Frame Control field for each of the frame types as defined for MAC frames according to the IEEE 802.11 standard. The values shown are binary. The Type field has value 11 which in the IEEE 802.11 standard is for "reserved" frames.

TABLE 1

| Frame | Type Field | Type Field Description | Subtype Field | Subtype Field Description |
|---|---|---|---|---|
| TSDT Downlink Data | 11 | Reserved | 0000 | TSDT Downlink Data |
| TSDT Downlink Ack | 11 | Reserved | 0001 | TSDT Downlink Ack |
| TSDT Data | 11 | Reserved | 0010 | TSDT Data |
| TSDT Ack | 11 | Reserved | 0011 | TSDT Ack |
| TSDT Ack + Data | 11 | Reserved | 0100 | TSDT Ack + Data |

A time-sensitive data train exchange sequence includes a sequence of TSDT frames of the TSDT types of Table 1. In one embodiment, Frames contained in a time-sensitive data train exchange sequence may be interspaced by Short Inter Frame Space (SIFS) intervals, if needed. A time-sensitive data train exchange sequence starts with a TSDT Downlink Data frame sent from AP to client stations.

In addition, in one embodiment, a new information element (IE) called a TSDT Scheduler IE is defined that is included in frames that are used by APs, such as an AP to advertise the AP's capability. Thus, in one embodiment that conforms to the IEEE 802.11 standard, a TSDT Scheduler IE is included in each beacon frame and probe response frame. The TSDT scheduler includes scheduling information.

Figure 3:
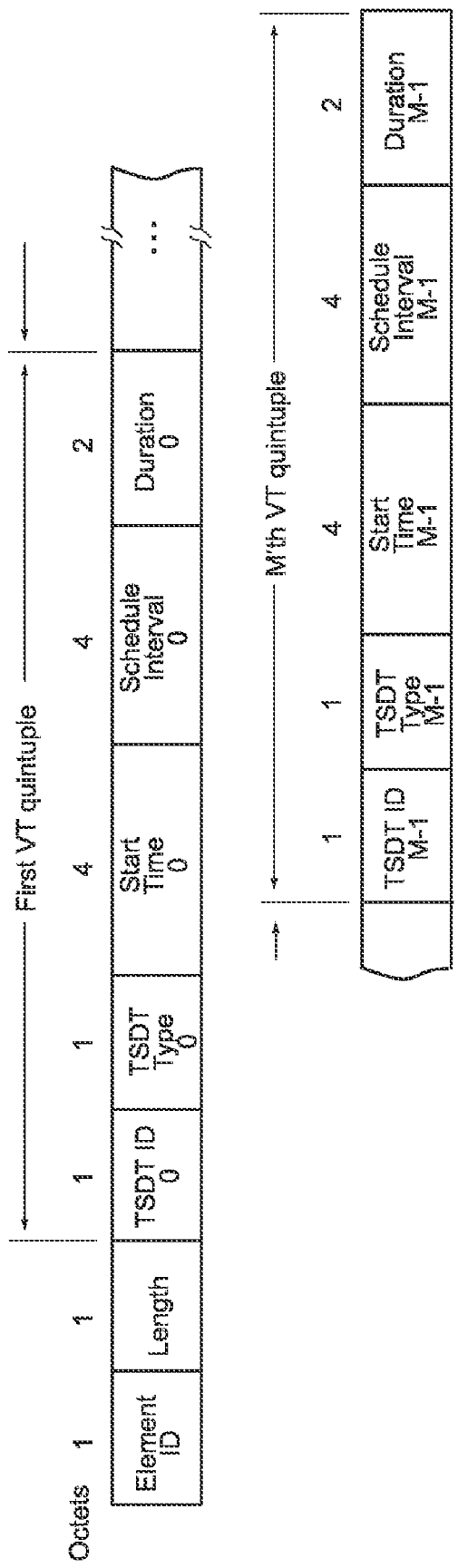
FIG. 3 shows a simple representation of an information element used for scheduling and included in beacon and probe response frames according to one or more embodiments of the present invention.

FIG. 3 shows a simple representation of a TSDT Scheduler IE for use in beacon and probe response frames. The TSDT Scheduler IE contains scheduling information about one or more time-sensitive data trains (TSDTs). FIG. 3 shows a number, denoted M, of time-sensitive data trains.

In FIG. 3, Element ID uniquely identifies the TSDT Scheduler IE.

Length indicates the length in bytes of the whole TSDT Scheduler IE, excluding the Element ID field and the Length field itself.

Each TSDT includes one or more time-sensitive data train exchange sequences. Each TSDT in a TSDT Scheduler IE is identified by a quintuple of information that includes the following five information items: TSDT ID, TSDT Type, Start Time, Schedule Interval, and Duration. For each time-sensitive data train, say the i'th, i=1, . . . M, TSDT ID i is an identifier of the time-sensitive data train that provides for entities to identify each particular time-sensitive data train.

TSDT Type i identifies the type of time-sensitive data train. The time-sensitive data trains described herein have a TSDT Type of value 0. Other TSDT Type values can be used in the future for different types of time-sensitive data trains.

Start Time i and Schedule Interval i respectfully define how often and exactly when a time-sensitive data train exchange sequence for the i'th TSDT occurs.

Duration i is the duration in units of 32 microseconds with time range from 32 to 8160 microseconds.

A time-sensitive data train exchange sequence of a TSDT Type f value 0 is defined to have the following time-sensitive data train exchange sequence:

1) A single TSDT Downlink Data frame from an AP to one or more client stations.
2) One or more TSDT Ack or TSDT Ack+Data frames following the TSDT Downlink Data frame, with each client station sending one such frame to the AP.
3) A single one TSDT Downlink Ack frame following the TSDT Ack or TSDT Ack+Data frames.

Other TSDT Type values from 1 to 65535 (decimal) are reserved for future use.

Call Admission Control and Bandwidth Assurance

In some embodiments of the invention, there is an amount of bandwidth dedicated to each time-sensitive data train in the form of a number of what herein are called "containers" allocated to it. Each container has a defined number of bytes of payload data of time-sensitive data. In some embodiments of the invention, each call has a number of containers of a time-sensitive data train allocated to it. Each time-sensitive payload, e.g., voice payload uses a fixed number of containers. For example, in one embodiment, each container includes 10 bytes of voice payload, and voice is delivered in Real Time Protocol (RTP) format conforming to the ITU-T G.729 standard. Such a payload includes 60 bytes including an Internet protocol (IP) header, a User Datagram Protocol (UDP) header, an RTP header and G.729 payload, therefore 6 containers.

When a call arrives at an AP, a call admission control (CAC) process running on the AP includes ascertaining if there is enough bandwidth available in any time-sensitive data train in the form of allocable containers in the time-sensitive data train to accommodate the call. If the required bandwidth is available, the call proceeds, including allocating the containers for the call. Otherwise, the call is rejected.

Internally, the AP maintains a data structure for containers. In the data structure includes an allocation status for each container of each time-sensitive data train. In one embodiment, the allocation status is one of IDLE, RESERVED, and ALLOCATED that have the following meanings:

IDLE: the container is not in use, so is allocable to a call.

RESERVED: the container is reserved for a call, so it not allocable. Recall that in one embodiment, when a call arrives at an AP, the call admission control process of the AP tests the TSDT for bandwidth needed to accommodate the call. In one embodiment, if enough bandwidth is found, the process changes the status of the number of containers that is needed for the bandwidth of the call to RESERVED.

ALLOCATED: the container is allocated for a call. When a call is connected, an embodiment of the call admission function changes the RESERVED status of the containers reserved for the call to ALLOCATED.

After a call is disconnected, an embodiment of the call admission function changes the ALLOCATED status of the containers used for the call to IDLE.

A call has one of several states, one of which is CONNECTED. Once a call successfully enters the CONNECTED state, the reserved bandwidth in the form of containers of status RESERVED will be granted to the call. These containers will have ALLOCATED status that will be maintained and fixed for the duration of the call until the call is disconnected. Thus one embodiment of the invention assures per-call bandwidth.

It is known to use call control signaling messages for granting of containers. For example, to connect a call, one embodiment uses Integrated Services Digital Network (ISDN) Q.931, one uses Connect as per ITU-T H.323, another uses 200 OK per the Session Initiation Protocol (SIP), and so forth. In one embodiment, the grant of containers to a call piggybacks on a call control signaling message, e.g. one conforming to ISDN Q.931, Connect as used in ITU-T H.323, 200 OK as used in SIP, and so forth. Other signaling methods may be used to grant containers if needed.

Aggregation Method

In one embodiment, aggregation of downlink data is achieved by having voice payloads toward a plurality of client stations included in the same TSDT Downlink Data frame. The AP transmits such a TSDT Downlink Data frame as the first frame of a TSDT exchange sequence of a time-sensitive data train of TSDT Type value 0. A TSDT Downlink Data frame includes a number of containers, which, as described above, can be dynamically allocated to carry voice payloads for different calls. Each call has its own dedicated containers allocated to it until the call is disconnected.

Figure 4:
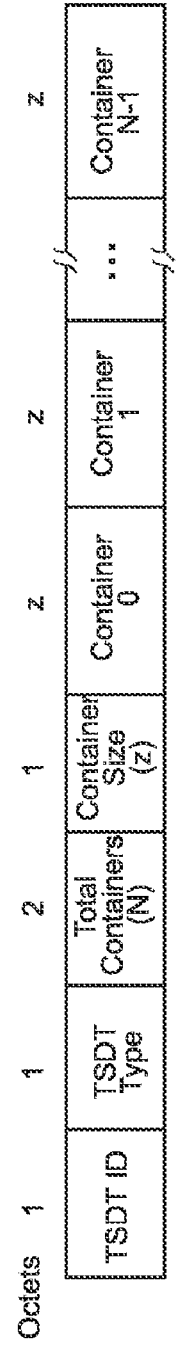
FIG. 4 shows a simple representation of a downlink time-sensitive data frame used by an access point for transmitting time-sensitive data to one or more client stations of the access point according to one or more embodiments of the present invention.

In one embodiment, a TSDT Downlink Data frame has the general MAC frame format defined in the IEEE 802.11 standard. FIG. 4 shows the frame body structure of TSDT Downlink Data frame according to an embodiment of the present invention.

The TSDT Downlink Data frame includes the following fields:

TSDT ID: this is the identifier of the time-sensitive data train.

TSDT Type: This is the type of time-sensitive data train, typically value 0.

Total Containers: This is a number, denoted N, of containers that are carried in the TSDT Downlink Data frame. The containers are for a number, at least one, of calls in the time-sensitive data train for a corresponding number of client stations.

Container Size: This is a number, denoted z, of bytes in each container. In one embodiment, each container can hold 10 bytes of client data. The number z is determined to be a convenient number so that bandwidth can be efficiently allocated to calls.

Container 0, Container 1, ... Container N−1: These are the N containers that may or may not be carrying time-sensitive, e.g., audio payload data.

Certain numbers of containers are allocated to the number of calls in the time-sensitive data train. Different calls in the time-sensitive data train may be allocated to a different number of containers. For example, assuming container size z to be 10 bytes, for a voice call with an RTP format voice payload that contain 60 bytes, e.g., a payload conforming to the ITU-T G.729 standard, 6 contiguous containers are allocated for this call.

The duration field in the MAC header of the TSDT Downlink Data frame contains the time value which covers total time needed for the whole time-sensitive data train exchange sequence, including all the interspacing SIFS intervals inserted within the time-sensitive data train exchange sequence. In one embodiment, assuming a number denoted $N_C$ of client stations riding on a time-sensitive data train, the number of SIFS intervals needed for the TSDT Type 0 time-sensitive data train exchange sequence will be $(2+N_C)$.

Scheduling Scheme

Some embodiments of the present invention include scheduling of time-sensitive data train exchange sequences of a time-sensitive data train. The AP includes a scheduling process, in the form of software in the host processing system of the AP that carries out the scheduling method when executed by the host processing system of the AP.

Recall that in one embodiment, an AP includes a TSDT Scheduler IE in each beacon and probe response that describes when time-sensitive data train exchange sequences occur. Recall also that the MAC processing in an AP includes a time synchronization function that provides a TSF time, denoted TSF herein, using a local TSF clock 135 (in FIG. 1). The AP scheduling process includes using the TSF time of the AP to schedule commencing sending a time-sensitive data train exchange sequences of a TSDT whenever the following is true:

$$(TSF-Start\ Time)mod(Schedule\ Interval)=0 \qquad (1)$$

Therefore, according to Eq. (1), starting at the TSF value Start Time, a time-sensitive data train exchange sequence commences every Schedule Interval.

A client station that is associated with the particular AP, i.e., that has received a beacon or probe response from the AP thus can determine when the access point transmits time-sensitive data downlink data frames.

In one embodiment, if the scheduling function encounters a busy wireless medium at a time a TSDT is meant to be launched according to Eq. 1, the scheduling function waits only a SIFS interval while keeping sensing the wireless medium to preempt any other contention for use of the wireless medium. This gives the highest priority to voice calls to use wireless medium at the expense of other applications not being granted access. Thus, priority is given to the time-sensitive data.

At each client station, such as client station 111, a process runs that includes the client station receiving TSDT Scheduler IE, such that the client station knows when the AP is starting time-sensitive data train exchange sequence(s) of each time-sensitive data train. For each BSS, there may be some stations that are part of a given time-sensitive data train, and some that are not. For any time-sensitive data train, each client station that is not part of the time-sensitive data train sets its network allocation vector (NAV), a counter resident at each station that represents the amount of time that the previous frame needs to send its frame, to have a value such that collision(s) in access of the wireless medium are avoided.

The client station involved in a time-sensitive data train receives the TSDT Downlink Data frame sent by its AP. Since all containers of a time-sensitive data train are of the same size, that is, the same number of bytes, the client station process includes the client station calculating which container in the TSDT Downlink Data frame involves the client station, and skipping all preceding containers of a received TSDT Downlink Data frame.

In a time-sensitive data train exchange sequence of TSDT Type 0, after a single TSDT Downlink Data frame is transmitted from an AP to client stations, e.g., addressed to the AP itself, associated client stations receiving the TSDT Downlink Data frame for whom there is data each send an acknowledgement to the AP.

In more detail, a client process at each client station that is part of the TSDT receives this TSDT Downlink Data frame and also ascertains that this frame is for its TSDT by checking the TSDT ID contained in the TSDT Downlink Data frame. Client stations that are not part of the TSDT ignore the TSDT Downlink Data frame.

As a result of receiving a TSDT Downlink Data frame, each client station in turn sends a single TSDT Ack frame or TSDT Ack+Data frame to the AP. To avoid collision for uplink direction, timings for client stations sending back their TSDT ACK or TSDT Ack+Data frames are pre-arranged by placing a send sequence number when containers are granted to a call, piggybacked on a proper call control message such as ISDN Q.931 Connect and SIP 200 OK. Each client station is assigned a different send sequence number. These numbers have integer values, each indicating an exact timing of sending a single TSDT Ack frame or TSDT Ack+Data frame.

Thus, in one embodiment, following receiving the TSDT Downlink Data frame and waiting for one SIFS interval, the client station with send sequence number equal 0 will first send its TSDT Ack or TSDT Ack+Data, the turn then passed to the client station with send sequence number 1, then to the client station with send sequence number 2, and so on. It is possible that some sequence numbers are not assigned to any calls. For example, the client with send sequence number 1 may hang up its call while the client with sequence number 2 is still engaged in a call. If a sequence number is not assigned, the air bandwidth corresponding to that sequence number may be unused by any client or the AP may use it for some other purpose.

In one embodiment, the time reserved for each client station is the same length no matter whether the client station is sending a TSDT Ack frame or a TSDT Ack+Data frame. The inventor decided that while this may use up uplink bandwidth, the advantage provided is that the transmission timing of the uplink voice payloads from all the calls will be known.

Figure 5:
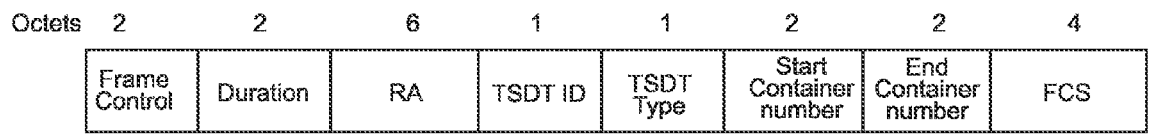
FIG. 5 shows a simple representation of an uplink time-sensitive data acknowledgement frame used by a client station to acknowledge receipt of time-sensitive data to an access point of the client station according to one or more embodiments of the present invention.
Figure 6:
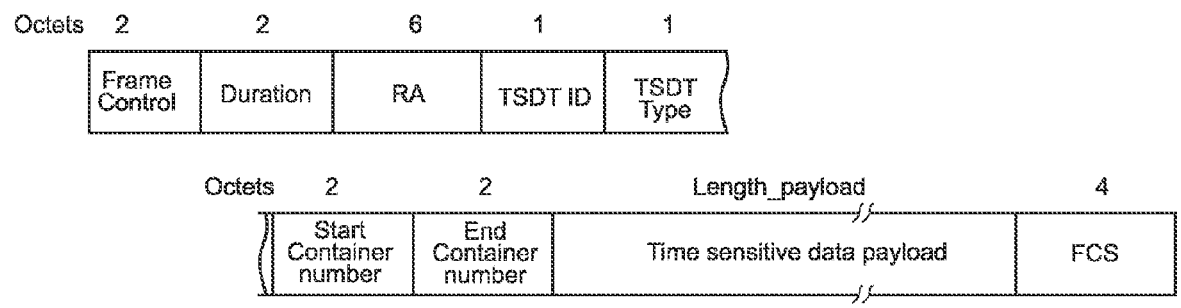
FIG. 6 shows a simple representation of an uplink time-sensitive data acknowledgement plus uplink data frame used by a client station to both acknowledge receipt of time-sensitive data and to transmit uplink data to an access point of the client station according to one or more embodiments of the present invention.

FIG. 5 describes the format of a TSDT Ack frame in accordance with an embodiment of the present invention. FIG. 6 describes the format of a TSDT Ack+Data frame in accordance with an embodiment of the present invention.

In FIG. 5, the Frame Control field is as described in the IEEE 802.11 standard and includes the Type and Subtype fields as shown in Table 1. The receiver address field is denoted RA as in the IEEE 802.11 standard. The Duration field contains the remaining time in microseconds for the time-sensitive data train exchange sequence, excluding the time needed to transmit this frame itself. The value of the remaining time is obtained by subtracting the time elapsed since starting the time-sensitive data train exchange sequence and the time needed for transmitting this TSDT Ack frame, including one SIFS interval, using information from the Duration field of the received TSDT Downlink Data frame for the time-sensitive data train exchange sequence. The frame control sequence (FCS) field is as described in the IEEE 802.11 standard.

FIG. 6 includes the fields of the frame of FIG. 5, with the addition of the voice payload. The length of the payload, denoted in FIG. 6 as Length_Payload, is (End Container number−Start Container number+1)/(Container Size). The Duration field for a TSDT Ack+Data frame as shown in FIG. 6 is calculated the same way as that used for calculating the value for a TSDT Ack frame. The maximum length of the whole frame body of an TSDT Ack+Data frame is as defined in the applicable standard, e.g., the IEEE 802.11 standard and its variants, including amendments.

Thus, after the AP sends the TSDT Downlink Data frame, the client stations send TSDT Ack or TSDT Ack+Data frames, one at a time. The AP receives the TSDT Ack or TSDT Ack+Data frames and, in one embodiment, waits a single SIFS interval, e.g., to tune the transmitter of its transceiver, and sends a single TSDT Downlink Ack frame to the client stations, again, addressed to the AP itself. The TSDT Downlink Ack is to acknowledge receiving the uplink speech frames from all the client stations. Thus, the AP acknowledges all client stations with a single frame.

Figure 7:
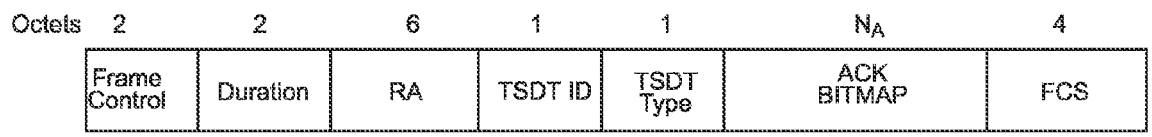
FIG. 7 shows a simple representation of a downlink time-sensitive acknowledgement frame used by an access point for transmitting an acknowledgement of receipt of time-sensitive data to one or more client stations of the access point according to one or more embodiments of the present invention.

FIG. 7 illustrates one frame format for a TSDT Downlink Ack frame according to one embodiment of the present invention. In FIG. 7, the Frame Control field is as described in the IEEE 802.11 standard and includes the Type and Subtype fields as shown in Table 1. The RA and FCS fields are as in the IEEE 802.11 standard. In one embodiment, the Duration field is set 0 to indicate the end of the time-sensitive data train exchange sequence.

The TSDT Downlink Ack frame includes a field to indicate to any receiving client station whether or not its payload was successfully received by the AP. One embodiment uses a bitmap denoted ACK BITMAP. The number of bits in ACK BITMAP is N, the number of containers in the time-sensitive data train. The bits in ACK BITMAP are numbered sequentially from 0 to N−1, with bit k corresponding to container k, k=0, 1, 2, 3, . . . , N−1. The length of ACK BITMAP in bytes is denoted $N_A$, so that $$N_A = N/8.$$

In one embodiment, bit k set to 1 indicates that the voice payload sent on the uplink from a client station involved in container k was successfully received. Otherwise bit k is set to 0. If a call with a particular client station is granted more than one container, in one embodiment, only the start container number is used in ACK BITMAP. The ACK BITMAP bits for the rest of the allocated container numbers are ignored.

Only those client stations riding this TSDT listen for and examine such a TSDT Downlink Ack frame.

Figure 8:
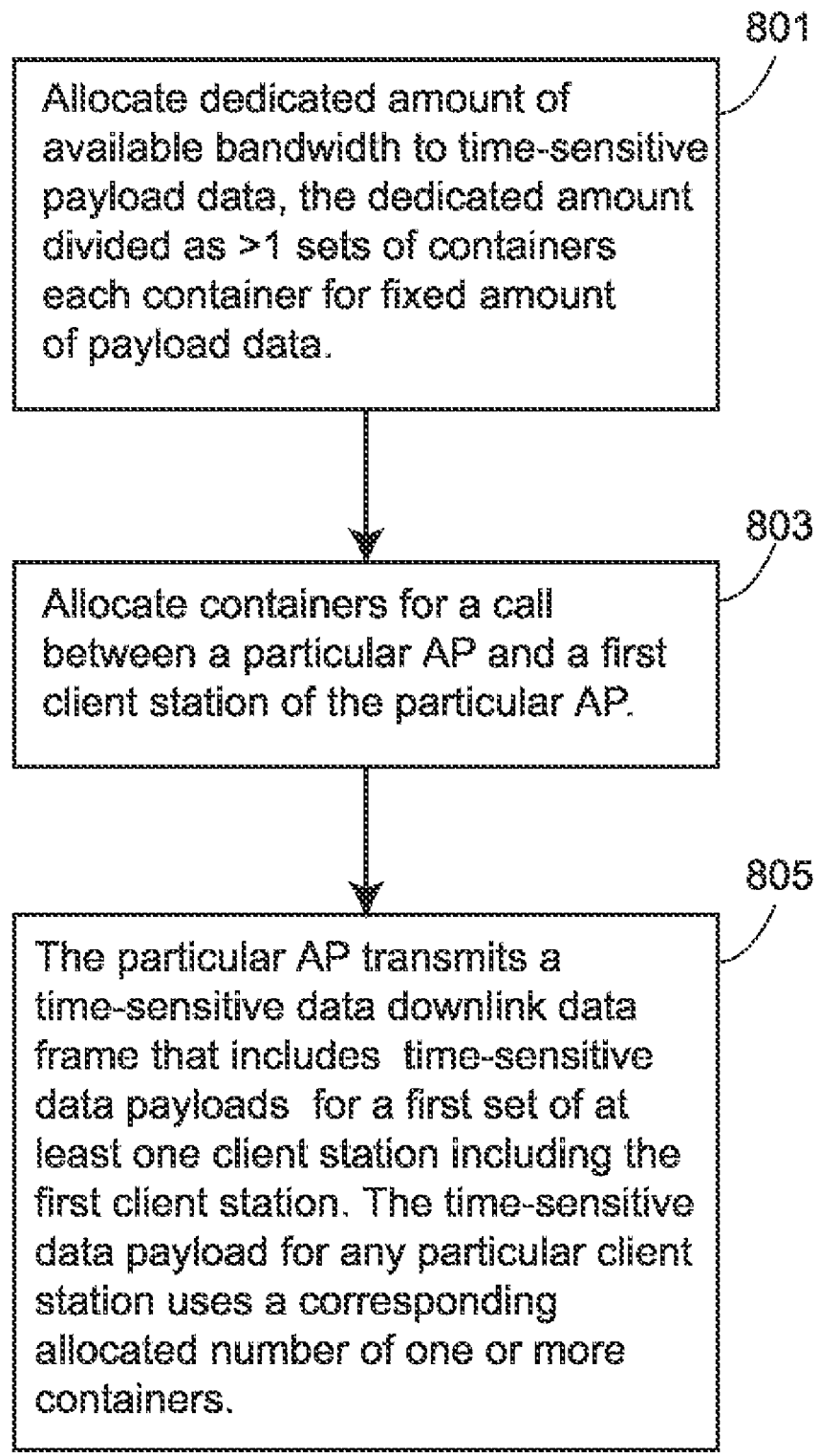
FIG. 8 illustrates an example method for delivery of time-sensitive data in a wireless network.

FIG. 8 illustrates an example method for delivery of time-sensitive data in a wireless network. The method includes in 801 allocating a dedicated amount of available bandwidth in a wireless network to time-sensitive payload data, e.g., voice or video services data. The dedicated amount is divided into one or more sets, with each set having more than one container. Each container is operable to carry a fixed amount of payload data.

The method further includes in 803 allocating a number of one or more containers of one of the sets of containers for a call between a particular access point of the wireless network and a first client station of the particular access point.

In 805, the particular access point transmits a time-sensitive data downlink data frame that includes time-sensitive data payloads for a first set of one or more client stations that includes the first client station. The time-sensitive data payload for any particular client station uses a corresponding allocated number of one or more containers of the one of the sets of containers.

Thus a method embodiment has been described for providing bandwidth for time-sensitive data such as voice data. The example method illustrated in FIG. 8 includes aggregation on the downlink from an access point, e.g., an AP. The method further provides timely delivery of frames that include time-sensitive data such as voice data in both the uplink and downlink direction for all individual calls. The available bandwidth is pre-allocated into two parts: one specifically for time-sensitive data such as VoIP calls, and the other for all other uses. The pre-allocation of certain bandwidth specific for use by voice calls is announced using a TSDT Scheduler IE in beacon and probe response frames. The pre-allocated bandwidth is divided into small units called containers that for any time-sensitive data train are of the same size.

Note that example embodiments have been described herein for delivering time-sensitive data such as voice data. However, the invention is not limited to voice data, and embodiments of the invention may be used for any type of time-sensitive data, including video data, audiovisual data, and so forth. Use of the term time-sensitive data train or TSDT does not restrict such a train to voice data.

In keeping with common industry terminology, the terms "base station", "access point", and "AP" may be used interchangeably herein to describe an electronic device that may communicate wirelessly and substantially simultaneously with multiple other electronic devices, while the terms "client station," "mobile device" and "STA" may be used interchangeably to describe any of those multiple other electronic devices, which may have the capability to be moved and still communicate, though movement is not a requirement. However, the scope of the invention is not limited to devices that are labeled with those terms.

Furthermore, while some of the description uses the term "quality-assured access-point" (Q-AP) as in the IEEE 802.11e standard, the access point embodiments of the invention are not limited to Q-APs, and can be used in any base station or access point (AP).

Furthermore, while example embodiments have been described for operation conforming to the IEEE 802.11 standard and variants of the IEEE 802.11 standard or amendments thereof, the invention may be embodied in entities of wireless networks conforming to other standards and for other applications, including, for example other WLAN standards and other wireless standards. Applications that can be accommodated include IEEE 802.11 wireless LANs and links, wireless Ethernet, HIPERLAN 2, WiMAX (IEEE 802.16), Bluetooth, European Technical Standards Institute (ETSI) broadband radio access network (BRAN), and multimedia mobile access communication (MMAC) systems, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), and so forth.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client station machine in server-client station network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, some embodiments of methods described herein are in the form of a computer-readable carrier medium carrying a set of instructions, e.g., a computer program that are for execution on one or more processors, e.g., one or more processors that are part of an access point. Other embodiments of methods described herein is in the form of a computer-readable carrier medium carrying a set of instructions, e.g., a computer program that are for execution on one or more processors, e.g., one or more processors that are part of an client station.

Thus some embodiments are in the form of logic encoded in one or more tangible media for execution and when executed operable to carry out a method of the methods described herein.

Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method comprising:
allocating a dedicated amount of available bandwidth in a wireless network to time-sensitive payload data, the dedicated amount being divided into one or more sets, each set comprising a plurality of containers, the containers of each set being structured to carry a fixed amount of payload data;

the particular access point transmitting a beacon or probe response frame that conforms to a published wireless standard, the published standard providing for additional information elements to be included in beacon frames and probe response frames that conform to the published standard, the transmitted beacon or probe response frame including an information element ("TSDT scheduler IE") announcing the allocation of the dedicated amount of available bandwidth and including scheduling information;

allocating a number of one or more containers of one of the sets of containers for a call between a particular access point of the wireless network and a first client station of the particular access point;

the particular access point transmitting a first time-sensitive data train downlink data frame that includes time-sensitive data payloads for a first set of one or more client stations including the first client station, the time-sensitive data payload for any particular client station using a corresponding allocated number of one or more containers of the one of the sets of containers; and the particular access point carrying on time sensitive communication with one or more of the first set of one or more client stations using time-sensitive data train exchange sequences, wherein a time-sensitive data train exchange sequence includes a single time-sensitive data train downlink data frame from the particular access point to the first set of one or more client stations, the time-sensitive data train downlink data frame being a MAC frame having first respective structure pre-defined for time sensitive data communication, one or more time-sensitive data train acknowledgement frames or time-sensitive data train acknowledgement with data frames following the time-sensitive data train downlink data frame, the time-sensitive data train acknowledgement frame being a MAC frame having a second structure distinct from the first structure, and pre-defined for time sensitive data communication, the time-sensitive data train acknowledgement with data frame being a MAC frame having a third respective structure distinct from the first and second structures, and pre-defined for time sensitive data communication, each time-sensitive data train acknowledgement frame or time-sensitive data train acknowledgement with data frame being from a client station for reception by the particular access point, and a single time-sensitive data train downlink acknowledgement frame for transmission from the particular access point as a result of the access point receiving a time-sensitive data train acknowledgement frame or a time-sensitive data train acknowledgement with data frame, the time-sensitive data train downlink acknowledgement frame being a MAC frame having fourth respective structure distinct from the first, second, and third structures, and pre-defined for time sensitive data communication.

2. A method as recited in claim 1, wherein the information element includes an indication of when time-sensitive data train downlink data frames including the first time-sensitive data train downlink data frame are transmitted by the access point, such that a client station that is associated with the particular access point can determine when the particular access point transmits time-sensitive data train downlink data frames.

3. A method as recited in claim 2, further comprising prior to the transmitting of the first time-sensitive data downlink data frame, the particular access point admitting a call from the first client station, the admitting including ascertaining if there is enough bandwidth available in any set in the form of containers that are allocable to accommodate the call.

4. A method as recited in claim 2, further comprising the particular access point maintaining a data structure that indicates for each container of each set the allocation status of the container.

5. A method as recited in claim 2, wherein the particular access point determines when to transmit a time-sensitive data train exchange sequence that starts with a time-sensitive data train downlink data frame using a time synchronization function that uses a local clock.

6. A method as recited in claim 2, further comprising: the particular access point receiving one or more time-sensitive data train acknowledgement or time-sensitive data train acknowledgement with data frames from one or more corresponding client stations of the particular access point to indicate successful reception of data in the time-sensitive data train downlink data frame, an time-sensitive data train acknowledgement with data frame including time-sensitive uplink data for the particular access point.

7. A method as recited in claim 6, further comprising: the particular access point transmitting a downlink time-sensitive data train acknowledgement frame to indicate to any client stations that sent time-sensitive uplink data to the particular access point whether or not the particular access point received the time-sensitive uplink data.

8. A method as recited in claim 1, wherein time-sensitive data train downlink data frames sent by the particular access point are MAC frames consistent with MAC frames that substantially conform with the IEEE 802.11 standard.

9. A method as recited in claim 8, wherein the particular access point is a quality assured access point of a quality assured basic service set.

10. A method as recited in claim 8, wherein the first time-sensitive data train downlink data frame includes an indication of the defined number of bits in each container.

11. A method comprising:
a particular client station associating with an access point of a wireless network, the wireless network conforming to a published wireless standard that provides for beacon or probe response frames, the published standard providing for additional information elements to be included in beacon frames and probe response frames that conform to the published wireless standard, the associating including receiving a beacon or probe response frame that conforms to the published wireless standard from the access point, the beacon or probe response frame including an information element ("TSDT scheduler IE") announcing an allocation of a dedicated amount of available bandwidth in a wireless network to time-sensitive payload data, the dedicated amount being divided into one or more sets, each set comprising a plurality of containers, the containers of each set being structured to carry a fixed amount of payload data, the TSDT scheduler IE including scheduling information;
the particular client station receiving a first time-sensitive data train downlink data frame from the access point, the first time-sensitive data train downlink data frame including time-sensitive data payloads for a first set of one or more client stations including the particular client station, the time-sensitive data payload for the particular client station being for a call for which a number of one or more containers of one of the sets of containers have been allocated,
the particular client station carrying on time sensitive communication with the access point using one or more time-sensitive data train exchange sequences, wherein a time-sensitive data train exchange sequence includes a single time-sensitive data train downlink data frame received from the access point ,the time-sensitive data train downlink data frame being a MAC frame having first respective structure pre-defined for time sensitive data communication, a time-sensitive data train acknowledgement frame or a time-sensitive data train acknowledgement with data frame transmitted to the access point as a result of receiving a time-sensitive data train downlink data frame, the time-sensitive data train acknowledgement frame being a MAC frame having a second structure distinct from the first structure, and pre-defined for time sensitive data communication, the time-sensitive data train acknowledgement with data frame being a MAC frame having a third respective structure distinct from the first and second structures, and pre-defined for time sensitive data communication, and a time-sensitive data train downlink acknowledgement frame from the access point for reception by the particular client station as a result of the access point receiving the time-sensitive data train acknowledgement frame or time-sensitive data train acknowledgement with data frame from the particular client station, the time-sensitive data train downlink acknowledgement frame being a MAC frame having fourth respective structure distinct from the first, second, and third structures, and pre-defined for time sensitive data communication.

12. A method as recited in claim 11, wherein the information element includes an indication of when time-sensitive data train downlink data frames including the first time-sensitive data train downlink data frame are transmitted by the access point, such that the particular client station can determine from the contents of the received beacon or probe response when the access point transmits time-sensitive data train downlink data frames.

13. A method as recited in claim 12, further comprising: the particular client station sending time-sensitive data train acknowledgement frame or a time-sensitive data train acknowledgement with data frame to the access point to indicate successful reception of data in the time-sensitive data train downlink data frame.

14. A method as recited in claim 13, wherein the time-sensitive data train acknowledgement with data frame includes time-sensitive uplink data for the access point in the number of containers allocated for the call.

15. A method as recited in claim 14, further comprising: the particular client station receiving a time-sensitive data train downlink acknowledgement frame from the access point to indicate whether or not the access point received the time-sensitivedata train acknowledgement or time-sensitive data train acknowledgement with data frame.

16. A method as recited in claim 11, wherein the first time-sensitive data train downlink data frame received from the access point is a MAC frame consistent with MAC frames that substantially conform with the IEEE 802.11 standard.

17. A method as recited in claim 16, wherein the first time-sensitive data train downlink data frame includes an indication of the defined number of bits in each container.

18. A tangible computer-readable storage medium configured with instructions that when executed by one or more processors in a particular access point cause the particular access point to:
- allocate a dedicated amount of available bandwidth in a wireless network to time-sensitive payload data, the dedicated amount being divided into one or more sets, each set comprising a plurality of containers, the containers of each set being structured to carry a fixed amount of payload data;
- allocate a number of one or more containers of one of the sets of containers for a call between a particular access point of the wireless network and a first client station of the particular access point; and
- transmit a beacon or probe response frame that conforms to a published wireless standard, the published standard providing for additional information elements to be included in beacon frames and probe response frames that conform to the published standard, the transmitted beacon or probe response frame including an information element ("TSDT scheduler IE") announcing the allocation of the dedicated amount of available bandwidth and including scheduling information;
- transmit a first time-sensitive data train downlink data frame that includes time-sensitive data payloads for a first set of one or more client stations including the first client station, the time-sensitive data payload for any particular client station using a corresponding allocated number of one or more containers of the one of the sets of containers; and
- carry on time sensitive communication with one or more of the first set of one or more client stations using time-sensitive data train exchange sequences, wherein a time-sensitive data train exchange sequence includes a single time-sensitive data train downlink data frame from the particular access point to the first set of one or more client stations, the time-sensitive data train downlink data frame being a MAC frame having first respective structure pre-defined for time sensitive data communication, one or more time-sensitive data train acknowledgement frames or time-sensitive data train acknowledgement with data frames following the time-sensitive data train downlink data frame the time-sensitive data train acknowledgement frame being a MAC frame having a second structure distinct from the first structure, and pre-defined for time sensitive data communication, the time-sensitive data train acknowledgement with data frame being a MAC frame having a third respective structure distinct from the first and second structures, and pre-defined for time sensitive data communication, each time-sensitive data train acknowledgement frame or time-sensitive data train acknowledgement with data frame being from a client station for reception by the particular access point, and a single time-sensitive data train downlink acknowledgement frame for transmission from the particular access point as a result of the access point receiving a time-sensitive data train acknowledgement frame or a time-sensitive data train acknowledgement with data frame, the time-sensitive data train downlink acknowledgement frame being a MAC frame having fourth respective structure distinct from the first, second, and third structures. and pre-defined for time sensitive data communication.

19. A tangible computer-readable storage medium configured with instructions that when executed by one or more processors in a particular client station cause the particular client station to:
- associate with an access point of a wireless network, the wireless network conforming to a published wireless standard that provides for beacon or probe response frames, the published standard providing for additional information elements to be included in beacon frames and probe response frames that conform to the published wireless standard, the associating including receiving a beacon or probe response frame that conforms to the published wireless standard from the access point, the beacon or probe response frame including an information element ("TSDT scheduler IE") announcing an allocation of a dedicated amount of available bandwidth in a wireless network to time-sensitive payload data, the dedicated amount being divided into one or more sets, each set comprising a plurality of containers, the containers of each set being structured to carry a fixed amount of payload data, the TSDT scheduler IE including scheduling information; and
- receive a first time-sensitive data train downlink data frame from the access point, the first time-sensitive data train downlink data frame including time-sensitive data payloads for a first set of one or more client stations including the particular client station, the time-sensitive data payload for the particular client station being for a call for which a number of one or more containers of one of the sets of containers have been allocated,
- carry on time sensitive communication with the access point using one or more time-sensitive data train exchange sequences, wherein a time-sensitive data train exchange sequence includes a single time-sensitive data train downlink data frame received from the access point, the time-sensitive data train downlink data frame being a MAC frame having first respective structure pre-defined for time sensitive data communication, a time-sensitive data train acknowledgement frame or a time-sensitive data train acknowledgement with data frame transmitted to the access point as a result of receiving a time-sensitive data train downlink data frame, the time-sensitive data train acknowledgement frame being a MAC frame having a second structure distinct from the first structure, and pre-defined for time sensitive data communication, the time-sensitive data train acknowledgement with data frame being a MAC frame having a third respective structure distinct from the first and second structures, and pre-defined for time sensitive data communication, and a time-sensitive data train downlink acknowledgement frame from the access point for reception by the particular client station as a result of the access point receiving the time-sensitive data train acknowledgement frame or time-sensitive data train acknowledgement with data frame from the particular client station, the time-sensitive data train downlink acknowledgement frame being a MAC frame having fourth respective structure distinct from the first, second, and third structures, and pre-defined for time sensitive data communication.

* * * * *

UNITED STATES PATENT AND TRADEMARK OFFICE
CERTIFICATE OF CORRECTION

PATENT NO. : 7,706,805 B2 Page 1 of 1
APPLICATION NO. : 11/468865
DATED : April 27, 2010
INVENTOR(S) : Xu It is certified that error appears in the above-identified patent and that said Letters Patent is hereby corrected as shown below:

In Column 19, line 62, kindly replace "third structures. and" with --third structures and--

Signed and Sealed this

Twenty-seventh Day of July, 2010

David J. Kappos
*Director of the United States Patent and Trademark Office*